July 4, 1939.  F. L. HART  2,164,455
SHAFT INDEXING DEVICE
Filed Jan. 12, 1939
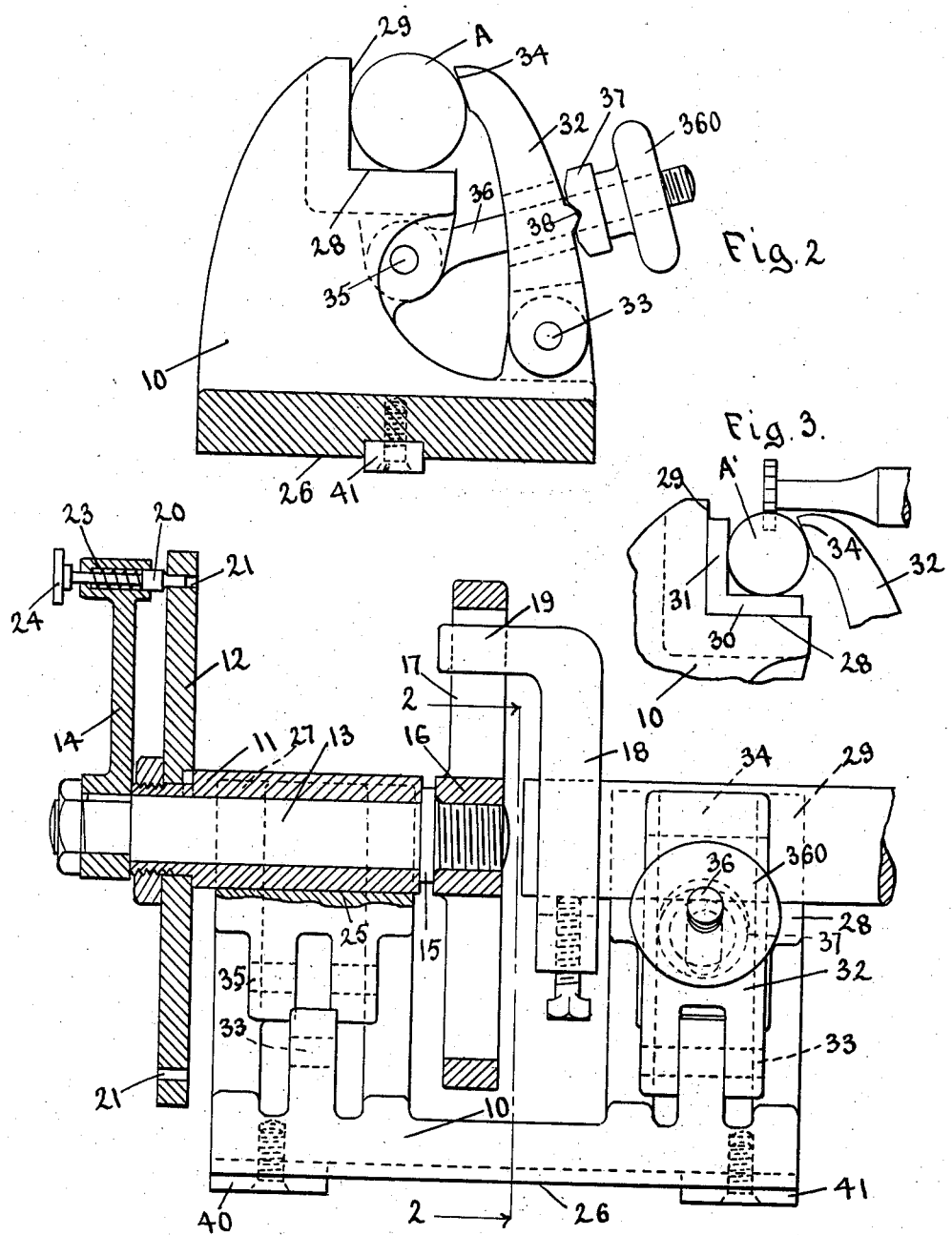
INVENTOR
Franklin L. Hart
by Fred W McArdle
Att'y Patented July 4, 1939

2,164,455

UNITED STATES PATENT OFFICE 2,164,455

SHAFT INDEXING DEVICE

Franklin L. Hart, Boston, Mass.

Application January 12, 1939, Serial No. 250,519

4 Claims. (Cl. 90—57)

My invention relates to fixtures adapted to be secured to the platen or table of a machine tool, and particularly to an indexing fixture in which a shaft or the like without axial center holes, may be supported and rotated in axial alignment with the indexing member, with angular accuracy. The indexing or so-called dividing head now in common use, is of complicated and expensive construction and available for many uses other than that above noted, and for this use it is necessary to drill and support the shaft axially in alignment with the indexing center of rotation, by separate means, or by special centering fixtures applied to the shaft.

My invention is not adapted to supersede the indexing head of the above character, but may be substituted for it in some classes of work, particularly on shafts and the like without axial center drilling which may require milling of flats or keyways at two or more angles.

My invention is in the nature of a demountable fixture of simple and relatively economical construction, that may be secured to the platen of a milling machine, planer or shaper, or to the table of a drill press, and in which a shaft, with or without axial center hole, may be aligned with an indexing member, and on which certain operations may be performed, and the shaft and indexing means be rotated together with angular precision.

One object of my invention is to provide a combination indexing fixture of simple construction which may be substituted for the usual form of dividing head, for many of the simpler operations on a shaft or the like, for which a dividing head is now required in connection with respective machine tools.

A second object is to provide a fixture of the above character, adapted to function in connection with a shaft or the like which are not provided with axial center holes.

A further object is to provide a fixture of the above character, in which the indexing member is demountable from its support, and adjustable relatively, portable with facility, and in which the indexing disc is interchangeable with other discs differently indexed.

The variety of uses for which I have found my invention available, include the cutting of keyways both semicircular and straight; milling of flats angularly disposed on a shaft; and similar operations that may be performed by a milling machine, shaper or planer. On a drill press it is adaptable for use in drilling at different angles with one another, countersinking and counterboring.

Other advantages will appear in the accompanying specification and claims and the drawing forming a part thereof.

My invention consists in the novel construction and combination of elements by means of which the foregoing objects are accomplished.

In the drawing,

Fig. 1 is a side elevation partly in section, of a preferred form of my invention.

Fig. 2 is a sectional end elevation on the line 2—2, Fig. 1.

Fig. 3 is a fragment showing the means I employ for supporting a shaft of diameter different from the diameter of the quill of the indexing member; also the facility with which a milling cutter of small diameter may be used, directly over the shaft supporting member, showing the availability of the fixture for cutting half round keyways, or the like.

Referring to the drawing,

In this embodiment of my invention, 10 is a bracket in which both the indexing member and the shaft A to be operated upon, are supported and rigidly secured in axial alignment. The quill 11 is supported in the bracket 10, and rigidly clamped as will be presently explained. To one end of the quill is rigidly secured a disc 12, in such manner that other similar discs may be substituted. The disc 12 is perforated as at 21 with holes angularly spaced. Other discs may be substituted with varied angular spacing for special operations.

Journaled in the quill 11, is a shaft 13, to one end of which is secured the indicator arm 14, rotatable in operative relation to the disc 12. The shaft 13 is provided near its other end with a collar 15, which, with the arm 14 serves to limit end play of the shaft in its bearing. Secured to this end of the shaft is an arm 16, rotatable therewith and slotted as at 17 for purposes presently to be described.

The indicator arm 14 is provided near its outer end with the plunger 20, adapted to engage perforations 21 in the disc 12. The plunger is yieldingly pressed toward the disc by the spring 23 and may be withdrawn by means of the button 24, rigid with the stem of the plunger, permitting the arm and shaft 13, together with the slotted arm 16, to be rotated to a succeeding angular position and secured by the engagement of the plunger with the particular perforation in the disc 12.

The quill 11 assembled with the other elements of the indexing member described, is mounted on the ledge 25, integral with the bracket 10 and parallel with its base surface 26, and normal to this ledge and upwardly projecting is a wall 27, against which, the quill bears. The shaft A is supported in like manner by the ledge 28, and the wall 29 respectively aligned with the members 25 and 27. Normally the shaft to be operated upon will not exceed in diameter that of the quill 11, and if of less diameter, I provide a shoe having webs 30, 31, normal to each other and of a thickness equal to one half the difference in diameter of the shaft and quill. This shoe resting on the ledge and against the wall, preserves the alignment of the indexing member and the shaft. Should it be found necessary to operate on a shaft of greater diameter than the quill, the same procedure may be employed with the quill.

In Fig. 3 I have shown this shoe in connection with a shaft A' of less diameter than the quill, and in addition have indicated the advantage this invention has in permitting the use of a cutter of small diameter without being obstructed by the shaft holding means.

Both quill and work are held and rigidly secured on respective ledges by suitable clamping means, one such means being an arm 32, hinged at 33 on the bracket base, the other end being formed with the face 34, radial with the center of rotation, which is so positioned on the bracket that the median line of the face 34 is approximately normal to a plane bisecting the angle formed by the ledge and wall, within the limits of its movement.

Hinged at 35 is an eye bolt 36 passing through the arm 32, the outer arm being threaded and engaged by the hand nut 360, the washer 37 being formed to rock at 38 on the arm 32, to compensate for different diameters of shaft or quill.

The shaft A may be connected with the indexing member by any suitable means, and I have shown one, comprising the dog 18 secured to the shaft and having a tail 19 adapted to engage the slot 17 of the arm 16.

The method of operation is as follows: The fixture is mounted on the platen of the particular machine tool, tongues 40, 41 downwardly projecting from the bracket base, engaging the slot in the platen. The indexing unit and shaft with connecting means are clamped in place. Before rotating the work to a new angular position, the clamp holding the work is loosened, and the plunger in the indicator arm withdrawn from the perforation in the indexing plate. As the arm is rotated the shaft is rotated with it, and the plunger is engaged with the perforation corresponding with the angular advance, and the clamp tightened on the shaft. The tongues are replaceable with others fitting different widths of slots on different machine tools, and the common type of T bolt is used for securing the fixture in place on the platen or table.

Having thus described my invention, I claim:

1. A shaft centering indexing fixture comprising in combination, a quill; a disc formed with angularly spaced perforations, secured to one end thereof; a shaft journaled in the quill and provided at one end with an arm adapted to engage the perforations of the disc, and at the other end with an arm adapted to be engaged by shaft connecting means; a supporting member having a base formed with a plane surface; alinged ledges parallel with said surface; and means for clamping the quill and a shaft in axial alignment on the ledges.

2. In a shaft centering indexing fixture of the character described in claim 1, an upwardly projecting wall from each ledge and normal thereto and aligned with each other, and against which the quill and shaft may be axially aligned.

3. In a shaft centering indexing fixture, of the character described in claim 1, an upwardly projecting wall from each ledge and normal thereto and aligned with each other; means for aligning shafts of diameters different from that of the quill, comprising a shoe formed with angular members normal to each other and of a thickness one half the difference in diameter of the quill and the shaft to be operated upon, and adapted to engage the ledge and wall of the support of the element of lesser diameter.

4. In a shaft centering and indexing fixture, a supporting member having a base formed with a plane surface adapted to be secured to the platen or table of a machine tool; a ledge integral therewith and parallel with the plane surface, and limited transversely by a wall normal thereto; a lever swiveled on the base and having at its outer end a face radial with the center of rotation, the median transverse line of which is adapted to swing within operative limits, substantially normal to a plane bisecting the angle formed by the ledge and its wall; and means for clamping a cylindrical object between the ledge, the wall and the face of the lever, including a threaded element movable secured to the supporting member, and projecting through the lever; and a member engaging therewith, adapted to press the face of the lever against the supported object.

FRANKLIN L. HART.